United States Patent
Odaohhara

(10) Patent No.: US 7,370,213 B2
(45) Date of Patent: May 6, 2008

(54) POWER SUPPLY UNIT AND COMPUTER

(75) Inventor: Shigefumi Odaohhara, Yamato (JP)

(73) Assignee: Lenovo (Singapore) Pte. Ltd. (SG)

( * ) Notice: Subject to any disclaimer, the term of this patent is extended or adjusted under 35 U.S.C. 154(b) by 1639 days.

(21) Appl. No.: 09/754,483

(22) Filed: Jan. 4, 2001

(65) Prior Publication Data

US 2001/0007134 A1 Jul. 5, 2001

(51) Int. Cl.
*G06F 1/26* (2006.01)
(52) U.S. Cl. .................................................... 713/300
(58) Field of Classification Search ................. 713/300
See application file for complete search history.

(56) References Cited

U.S. PATENT DOCUMENTS

| | | | | |
|---|---|---|---|---|
| 5,498,984 | A * | 3/1996 | Schaffer | 327/51 |
| 5,796,182 | A * | 8/1998 | Martin | 307/66 |
| 5,796,982 | A * | 8/1998 | Iwami et al. | 703/18 |
| 6,150,798 | A * | 11/2000 | Ferry et al. | 323/273 |
| 6,351,416 | B2 * | 2/2002 | Fuchigami et al. | 365/185.21 |
| 6,600,239 | B2 * | 7/2003 | Winick et al. | 307/85 |
| 6,651,178 | B1 * | 11/2003 | Voegeli et al. | 713/300 |

FOREIGN PATENT DOCUMENTS

| | | |
|---|---|---|
| JP | 63219368 | 3/1990 |
| JP | 03-60880 | 6/1991 |
| JP | 07125401 | 2/1996 |

* cited by examiner

*Primary Examiner*—Rehana Perveen
*Assistant Examiner*—Eric Chang
(74) *Attorney, Agent, or Firm*—Carlos Munoz-Bustamante; Dillon & Yudell LLP

(57) ABSTRACT

A series power supply circuit and a switching power supply circuit are combined within a single power supply unit. The switching power supply circuit provides an efficiency lower than that of the series power supply circuit under a light load and provides an efficiency higher than that of the series power supply circuit under a heavy load. A standby signal that is asserted under a light load and is deasserted under a heavy load is input to a negative logic enable terminal (−EN) of the series power supply circuit through an inverter0. The standbysignal is directly input to the negative logic enable terminal (−EN) of a PWM controller in the switching power supply circuit.

7 Claims, 7 Drawing Sheets

POWER SUPPLY UNIT AND COMPUTER

BACKGROUND OF THE INVENTION

1. Technical Field

The present invention relates to a computer power supply unit, and in particular to a power supply unit which operates efficiently under a wide range of load conditions from light to heavy within a computer.

2. Description of the Related Art

In a personal computer (PC) a DC (direct current)/DC converter is typically provided for converting an applied DC voltage into various DC voltage levels, such as 2.5 V or 3.3 V, that are supplied to different parts (load) of the PC. Among the types of power supply circuits that can be used as such DC/DC converters are switching power supply circuits and series power supply circuits.

FIG. 8(A) illustrates an example power conversion efficiency measurement for a switching power supply circuit (commercially available as an integrated circuit (IC) chip) wherein the input voltage is 3.3 V and the output voltage is 2.5 V. As depicted in FIG. 8(A), the switching power supply circuit has a low power conversion efficiency when the output current (load current) is small, i.e., under a light, and improves as the output current increases, i.e., a heavier load. In the example shown in FIG. 8(A), the power conversion efficiency decreases dramatically when the output current is less than 20 mA and improves to 75% to 83% when the output current exceeds 20 mA.

With reference to FIG. 8(B), there is depicted an example power conversion efficiency measurement that is characteristic of a series power supply circuit (commercially available as an IC chip) wherein the input voltage is 3.3 V and the output voltage is 2.5 V. As illustrated in FIG. 8B, the power conversion efficiency is not substantially altered in accordance with load changes. While the ideal power conversion efficiency of a series power supply circuit when the input voltage is 3.3 V and the output voltage is 2.5 V is about 76% (=2.5/3.3'100), actual power conversion efficiencies are within the range of 65% to 72% as depicted in FIG. 8(B) due to environmental influences such as a circuit loss.

As depicted with reference to FIGS. 8(A) and 8(B), the power conversion efficiency of both types of power supplies suffers at either end of the load spectrum, i.e., low power conversion efficiency for switching power supply circuits under light loads and lower power conversion efficiency for series power supply circuits under heavy loads relative to switching power supply circuit.

A power supply unit that provides high power conversion efficiency under a wide range of loads from light to heavy is required for portable PCs such as notebook PCs, sub-notebook PCs, palmtop PCs, and personal data assistants (PDA), which alternate between active mode and suspend mode (a low load condition).

Technologies that address the above-mentioned problems are described in Published Unexamined Patent Application Nos. 11-8933 and 8-149804. The technology described in Published Unexamined Patent Application No. 11-8933 provides a first stabilized power supply circuit (a series power supply circuit) supporting lighter loads and a second stabilized power supply circuit (a switching power supply circuit) and activates or inactivates the second stabilized power supply circuit depending on the amount of load current to accommodate load variations. The technology described in Published Unexamined Patent Application No. 8-149804 provides a first switching device for smaller currents and a second switching device for larger currents in a switching power supply circuit and switches between the first and second switching devices corresponding to the load current value, thereby reducing the switching device power and improving the power conversion efficiency under a load current variation condition.

A higher precision output voltage must be provided for both of the series and switching power supply circuits described in the above-mentioned Published Unexamined Patent Application No. 11-8933 since the cumulative output voltage is provided by both of the power supply circuits. Accordingly, higher precision components must be used, or the number of components must be increased, resulting in higher costs.

For example, letting $V_{TYP}$ be the average output voltage and 5% be the precision required by load electronics (such as ICs, LSIs), the maximum output voltage $V_{max}$ is $V_{TYP}$+5% and the minimum output voltage $V_{min}$ is $V_{TYP}$−5%. Assuming that the output voltage, V10, of a series power supply circuit is controlled so as to be within a range from $V_{TYP}$+1% to $V_{TYP}$+5%, and the output voltage, V30, of a compound power supply circuit consisting of the series power supply circuit and a switching power supply circuit is controlled so as to be within $V_{TYP}$−5% to $V_{TYP}$+1%, an output precision of ±2% is required for the series power supply circuit, and an output precision of ±3% is required for the switching circuit. To achieve such precision, high-precision components or an increased number of components are required compared to a design for providing an output precision of ±5%.

The system described in the above-mentioned Published Unexamined Patent Application No. 11-8933 has a lower output voltage precision due to a voltage drop over an output load current detection resistance on the output side. The system described in the above-mentioned Published Unexamined Patent Application No. 8-149804 also suffers a reduced lower output voltage precision due to a voltage drop over an output load current detection resistance on the output side.

It would therefore be useful to provide a power supply unit that provides a higher efficiency and output voltage precision under a wide range of loads.

SUMMARY OF THE INVENTION

A first power supply unit according to the present invention comprises a plurality of power supply circuits having different power conversion efficiency characteristics for converting an input voltage into a predetermined voltage and input means for inputting a control signal for controlling power consumption states. Here, the power conversion efficiency characteristics represents changes in power conversion efficiency in response to the amount of current (load current) flowing through a load to which power is supplied by the power supply unit. The control signal includes a standby signal indicating whether the computer is in suspend state (a low power consumption state) or not in the case where the component operating on the power supplied by the first power supply unit is a load of the computer.

In the first power supply unit according to the present invention, switching means causes switching to one of the plurality of power supply circuits based on the control signal input through the input means. Thus, the only the power supply circuit that provides a higher power conversion efficiency is activated to provide output power according to the state of the control signal.

Thus, because the first power supply unit according to the present invention comprises a plurality of power supply circuits having different power conversion efficiency characteristics for converting an input voltage to a predetermined voltage and allows power output to be provided from one of the plurality of power supply circuits which converts power most efficiently according to the state of a control signal, the first power supply unit can provide a high power conversion efficiency under a wide range of loads from light to heavy, and the output precision of each power supply circuit can be made substantially the same as that of the entire power supply unit because the plurality of power supply circuits does not operate concurrently. As a result the first power supply unit can achieve a higher precision with low costs.

The switching means of the first power supply unit may be configured to comprise activation means associated with each of the plurality of power supply circuits for activating the associated power supply circuit according to the state of the control signal. With this configuration, the switching means may be simplified.

Widely used power supply circuits include the series power supply circuit and the switching power supply circuits described with reference to FIG. 8. As described above, the power conversion efficiency of a series power supply circuit typically varies little over a wide range of load conditions from light to heavy and the power conversion efficiency of a switching power supply circuit typically is lower than that of the series power supply circuit under light load and higher than that of the series power supply circuit under heavy load.

It is therefore preferable that the plurality of power supply circuits of the first power supply unit includes a power supply circuit for light load, such as a series power supply circuit, and a power supply circuit for heavy load, such as a switching power supply circuit, and the switching means causes switching to the power supply circuit for light load when a control signal for reducing power consumption is input or causes switching to the power supply circuit for heavy load when the control signal for reducing power consumption is not input. Thus, a power output can be provided by the power supply circuit for light load when the control signal for reducing power consumption is input, that is, load is relatively light, and a power output can be provided by the power supply circuit for heavy load when the control signal for reducing power consumption in not input, that is, when load is relatively heavy. As a result, high efficiencies can be achieved under a wide range of load conditions from light to heavy.

The power output of the first power supply unit may temporarily be broken during switching between the power supply circuits by the switching means. The break of the power output is commonly called a "instantaneous power failure." In most cases the instantaneous power failure is undesirable because it may cause a malfunction of an apparatus operating on power supplied by the power supply unit.

Therefore it is preferable that holding means is provided for holding a power output in the first power supply unit for a predetermined period of time during switching by the switching means. This can prevent the instantaneous power failure.

The second power supply unit according to the present invention comprises a plurality of power supply circuits having different power conversion efficiency characteristics for converting an input voltage into a predetermined voltage and detecting means for detecting the amount of power consumption. As in the first power supply unit, the power conversion efficiency characteristic represents changes in power conversion efficiency in response to the amount of current (load current) flowing through a load to which power is supplied by the power supply unit.

In the second power supply unit according to the present invention, switching means causes switching to one of the plurality of power supply circuits based on power consumption detected by detecting. Thus, the only the power supply circuit that provides a higher power conversion efficiency is activated to provide output power in response to the amount of power consumption proportional to the amount of a load current.

Thus, because the second power supply unit according to the present invention comprises a plurality of power supply circuits having different power conversion efficiency characteristics for converting an input voltage to a predetermined voltage and allows power output to be provided from one of the plurality of power supply circuits which converts power most efficiently according to power consumption, the second power supply unit can provide a high power conversion efficiency under a wide range of loads from light to heavy, and the output precision of each power supply circuit can be made substantially the same as that of the entire power supply unit because the plurality of power supply circuits does not operate concurrently. As a result the second power supply unit can achieve a higher precision with low costs.

As described above, the technology described in the above-mentioned Published Unexamined Patent Application Nos. 11-8933 and 8-149804 have the problem that the precision of the output voltage is lowered by a voltage drop due to a current flowing through a resistance because the resistance is provided on the output side of the power supply circuit in order to detect a load current.

Preferably the detecting of the second power supply unit according to the present invention can detect power consumption based on electric power input to the plurality of power supply circuits. By this, the output precision of the power supply unit can be improved.

The switching means of the second power supply unit may be configured to comprises activation means that is associated with each of the plurality of power supply circuits and activates the associated power supply circuit based on the power consumption. By this, the configuration of the switching means can be simplified.

As described above, the power supply circuits include a series power supply circuit and a switching power supply circuit. The power conversion efficiency of a series power supply circuit typically varies little over a wide range of load conditions from light to heavy and the power conversion efficiency of a switching power supply circuit typically is lower than that of the series power supply circuit under light load and higher than that of the series power supply circuit under heavy load.

Therefore it is preferable that the plurality of power supply circuits of the second power supply unit includes a power supply circuit for light load, such as a series power supply circuit, and a power supply circuit for heavy load, such as a switching power supply circuit, and the switching means causes switching to the power supply circuit for light load when power consumption is smaller than a predetermined value and switching to the power supply circuit for heavy load when power consumption is greater than a predetermine value. Thus, a power output can be provided from the power supply circuit for light load when power consumption is smaller than the predetermined value, that is, when load is relatively light, and a power output can be provided from the power supply circuit for heavy load when power consumption is greater than the predetermined value, that is, when load is relatively heavy. As a result, high efficiencies can be achieved under a wide range of load conditions from light to heavy.

It is preferable that, as the above-mentioned predetermined value, a power consumption value is preset that corresponds to a position at which a curve representing power conversion efficiency characteristics of the power supply circuit for light load intersects with a curve representing power conversion efficiency characteristics of the power supply circuit for heavy load. By this the best power conversion efficiency can be achieved.

The power output of the second power supply unit may temporarily be broken during switching between the power supply circuits by the switching means. As described above, this instantaneous power failure is undesirable in many cases because it may cause a malfunction of an apparatus which operates on power supplied by the power supply unit.

Therefore it is preferable that holding means is provided for holding an power output in the second power supply unit for a predetermined time period during switching by the switching means. This can prevent the instantaneous power failure.

The computer according to the present invention comprises a power supply unit according to the present invention and a computer load operating on electric power supplied by the power supply unit.

Thus, with the computer according to the present invention, high efficiencies can be achieved under various load conditions from light to heavy and therefore power consumption can be reduced, because a plurality of power supply circuits is provided having different power conversion efficiency characteristics and output power is allowed to be provided from one of the plurality of power supply circuits which converts power most efficiently according to the state or amount of power consumption.

DETAILED DESCRIPTION OF THE PREFERRED EMBODIMENT

Embodiments of the present invention will be described below with reference to the accompanying drawings. While the present invention relates to a power supply unit comprising multiple power supply circuits each having different power conversion efficiency characteristics, the embodiments depicted herein have two power supply circuits for simplicity and clarity of explanation.

Figure 1:
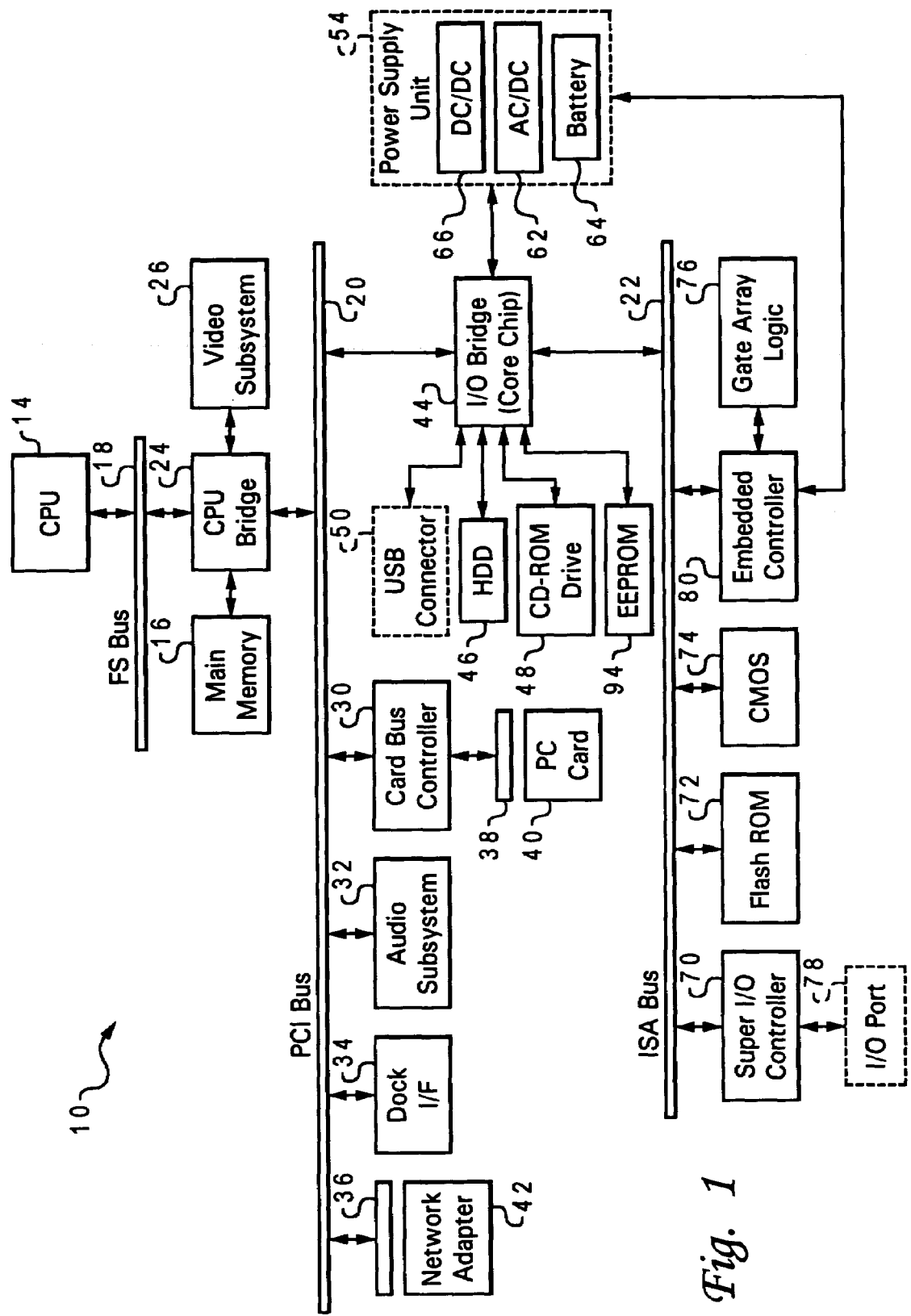
FIG. 1 is a block diagram depicting a computer system in accordance with a preferred embodiment of the present invention.

With reference now to the figures wherein like reference numerals refer to like and corresponding parts throughout, and in particular with reference to FIG. 1, there is depicted a subsystem-level hardware configuration of a computer system 10. Computer system 10 is a personal computer (PC) having a power supply unit designed in accordance with a preferred embodiment of the present invention. The power supply unit of the present invention may be advantageously applied within a variety of extant PC systems including a notebook PC 12 (see FIG. 2) running Windows 98 or NT from Microsoft Corporation, or OS/2 from IBM Corporation as an operating system (OS). The components of computer system 10 will be described hereinbelow.

A central processing unit (CPU) 14, is the brain of computer system 10, and performs various programs under the OS. CPU 14 may be, for example, a CPU chip such as "Pentium," "MMX Technology Pentium," or "Pentium Pro" from Intel Corporation or other CPUs from other manufacturer such as AMD, or "PowerPC" from IBM. CPU 14 includes a Level-2 (L2) cache, which is a fast-operating cache for reducing the total time required to access a main memory 16 by temporarily storing limited codes and data that are frequently accessed. Such an L2 cache typically consists of a static RAM (SRAM) chip and has a storage capacity of 512 kB or more.

CPU 14 is interconnected with other hardware components (described in further detail below through three levels of busses: a FrontSide (FS) bus 18, which is a directly connected to an external pin of CPU 14, a Peripheral Component Interconnect (PCI) bus 20, which is a fast I/O-device bus, and an Industry Standard Architecture (ISA) bus 22, which is a low-speed I/O-device bus.

FS bus 18 is interfaced with PCI bus 20 by a CPU bridge (host-PCI bridge) 24, which is commonly called a memory/PCI control chip. In accordance with the depicted embodiment, CPU bridge 24 comprises a memory controller facility for controlling accesses to main memory 16 and a data buffer for accommodating a difference in data transfer rate between FS bus 18 and PCI bus 20. Exemplary models for CPU bridge 24 includes the 440BX from Intel Corporation, or similar devices.

Main memory 16 is writable memory used as an area into which an execution program executed by CPU 14 is loaded. Main memory 16 is also a working area into which data processed by the execution program is written. Main memory 16 typically consists of a plurality of dynamic RAM (DRAM) chips and may have, for example, a standard 32 MB capacity expandable to 256 MB. In recent years the DRAM has evolved into fast page-state DRAM, extended data out (EDO) DRAM, synchronous DRAM (SDRAM), burst EDO DRAM, RDRAM in order to respond to demands for faster read time.

An execution program includes an OS such as Windows 98, device drivers for hardware-manipulating peripheral devices, an application program for a specific application, and firmware such as Basic Input/Output system (BIOS: a program for controlling input/output operations for hardware such as a keyboard and floppy disk drive).

PCI bus 20 is a relatively high speed bus (for example, data width of 32/64 bits, the maximum operating frequency of 33/66/100 MHZ, the maximum data transfer rate of 132/264 MBps) that is connected to PCI devices such as a card bus controller 30 that drives data at a relatively high speed. The PCI architecture, which was initially proposed by Intel Corporation, implements the so-called "plug and play (PnP)" capability.

Figure 2:
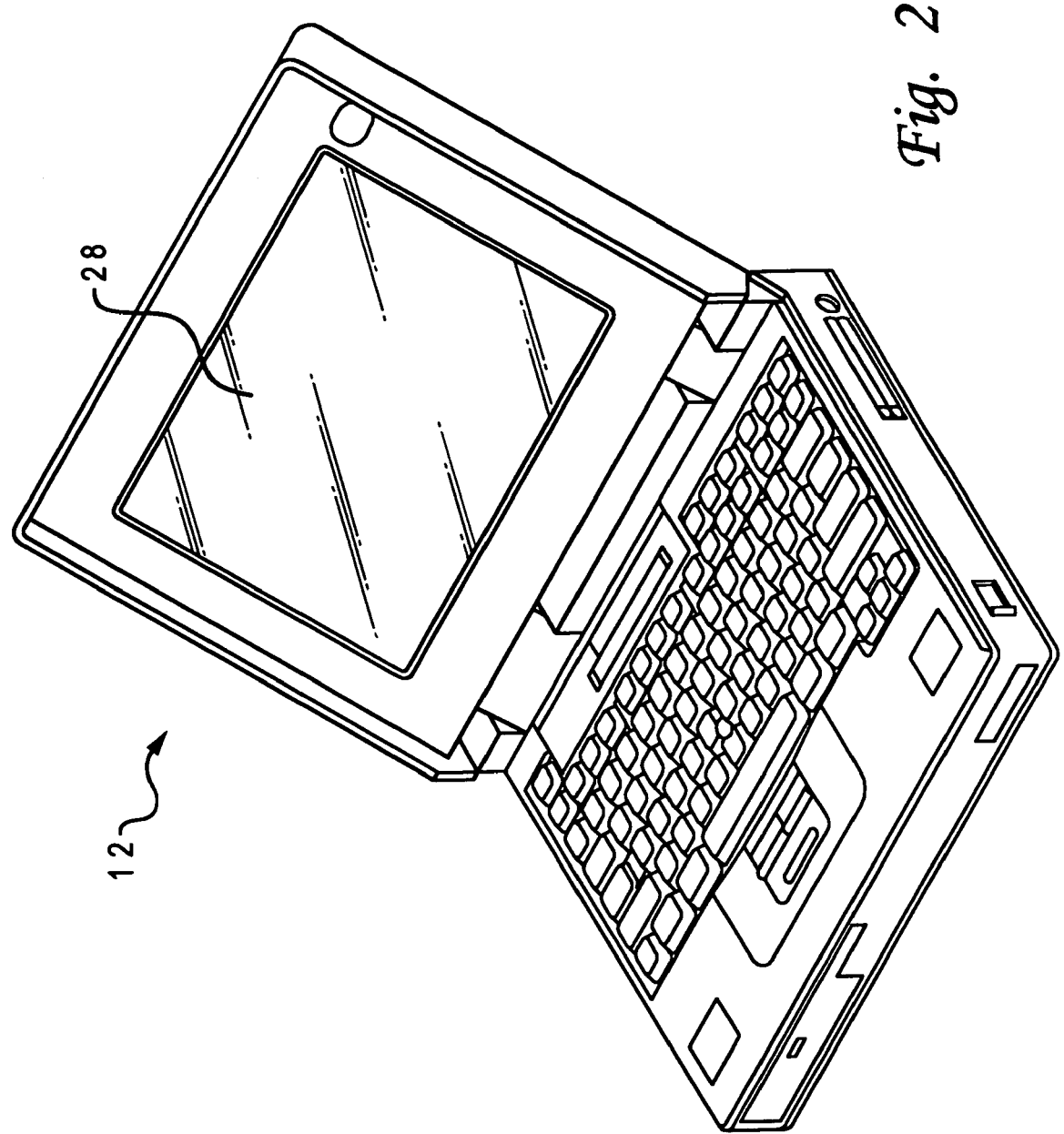
FIG. 2 is a perspective view of the exterior of a notebook personal computer.

A video subsystem 26 implements video-relating functions and includes a video controller that, in effect, processes an imaging instruction from CPU 14, writes the processed imaging information to video memory (VRAM), and reads the imaging information from the VRAM to output it as imaging data to a liquid crystal display (LCD) 28 (see FIG. 2). The video controller can convert a digital video signal into an analog video signal by means of a digital-analog converter (DAC) associated with it. The analog video signal is provided to a CRT board (not shown) through a signal line.

Connected to PCI bus 20 are a card bus controller 30, an audio subsystem 32, a docking station interface (Dock I/F) 34, and a mini PCI slot 36. Card bus controller 30 is a dedicated controller for directly coupling a bus signal on PCI bus 20 to the interface connector (card bus) of a PCI card bus slot 38. Plugged into the card bus slot 38 is, for example, a PC card 40 which is disposed on an wall of PC 12 and compliant with a specification (for example "PC Card Standard 95") developed by the Personal Computer Memory Association/Japanese Electronic Industry Development Association (PCMCIA/JEIDA).

Dock I/F 34 is a hardware unit for connecting PC 12 with a docking station (not shown). When the PC 12 is housed in the docking station, an internal bus of the docking station is connected to Dock I/F 34 and hardware components connected to the internal bus of the docking station are connected to PCI bus 20 through Dock I/F 34. Connected to mini PCI slot 36 is, for example, a network adapter 42 for connecting computer system 10 to a network (a local area network, for example).

PCI bus 20 and ISA bus 22 are interconnected by an I/O bridge 44. I/O bridge 44 includes a real time clock (RTC) and serves to bridge PCI bus 20 and ISA bus 22, a DMA controller function, a programmable interruption controller (PIC) function, a programmable interval timer (PIT) function, an Integrated Drive Electronics (IDE) interface function, a Universal Serial Bus (USB) function, and a System Management Bus (SMB) function. In accordance with the depicted embodiment, I/O bridge 44 may be a device (core chip) called "PIIX4" from Intel Corporation.

The DMA controller function allows data transfer between a peripheral device (for example, a floppy disk drive) and the main memory 16 to be performed without intervention by the CPU 14. The PCI function causes a predetermined program (interrupt handler) to be executed in response to an interrupt request (IRQ) from a peripheral device. The PIT function causes a timer signal to be generated at predetermined intervals that are programmable.

An IDE hard disk drive (HDD) 46 is connected to the IDE interface implemented by the IDE interface function. An IDE CD-ROM drive 48 is also connected to the IDE interface through an AT Attachment Packet Interface (ATAPI). Instead of the IDE CD-ROM drive 48, other types of IDE device such as a DVD (Digital Video Disc or Digital Versatile Disc) drive may be connected to the IDE interface. External storage devices other than the HDD 46 and CD-ROM drive 48 are placed, for example, in a space called a "media bay" or "device bay" within the PC 12. These standard external storage devices may be installed exchangeably and exclusively with other equipment such as a FDD and a battery pack.

A USB port is provided within I/O bridge 44. The USB port is connected to a USB connector 50 that is in turn provided, for example, on a wall of PC 12. The USB supports the ability to remove/insert a new peripheral device (USB device) while the system is powered on (hot plugging) and the ability to automatically recognize the newly added peripheral device and re-configure the system (plug and play capability). Up to 63 USB devices can be daisy-chained to one USB port. Examples of the USB device include various devices such as a keyboard, a mouse, a joy-stick, a scanner, a printer, a modem, a display monitor and a tablet.

Also connected to the I/O bridge 44 is an EEPROM 94 through the SM bus. EEPROM 94 is memory device for storing information such as a user-specified password, a supervisor password, and a product serial number, and is nonvolatile and electrically rewritable. I/O bridge 44 is connected to a power supply section 54. Power supply section 54 comprises circuits such as an AC/DC converter 62, a charger for charging a battery 64, and a DC/DC converter 66 for generating a DC constant voltage of, for example, 5 V or 3.3 V used within computer system 10.

Within the core chip composing the I/O bridge 44 a logic unit, i.e., a state machine (not depicted) manages of the power state of the computer system 10 by manipulation of an internal register. The logic unit sends and receives various signals to and from power supply section 54 and recognizes the state of the power supplied from power supply section 54 to the computer system 10 in accordance with data encoded within these signals. Power supply section 54 controls power supply to the computer system 10 according to an instruction from the logic unit within I/O bridge 44.

ISA bus 22 has a lower data transfer rate than PCI bus 20 (for example, a bus width of 16 bits and the maximum data transfer rate of 4 Mbps). ISA bus 22 is used for connecting a Super I/O controller 70, flash ROM 72 (implemented as memory such as an EEPROM), a CMOS device 74, an embedded controller 80 connected to a gate array logic 76, and peripheral devices that operate at relatively low speeds such as a keyboard/mouse controller (not shown).

An I/O port 78 is connected to Super I/O controller 70. Super I/O controller 70 drives a floppy disk drive (FDD) (not depicted) and controls the inputs/outputs of parallel data (PIO) through a parallel port and the inputs/outputs of serial data (SIO) through a serial port.

Flash ROM 72 contains programs such as a BIOS and is nonvolatile and electrically rewritable. CMOS device 74 is configured with nonvolatile semiconductor memory connected to a backup power supply and acts as nonvolatile and high-speed memory means.0 Embedded controller 80 controls a keyboard (not shown) and is part of the power management functionality in combination with gate array logic 76.

Figure 3:
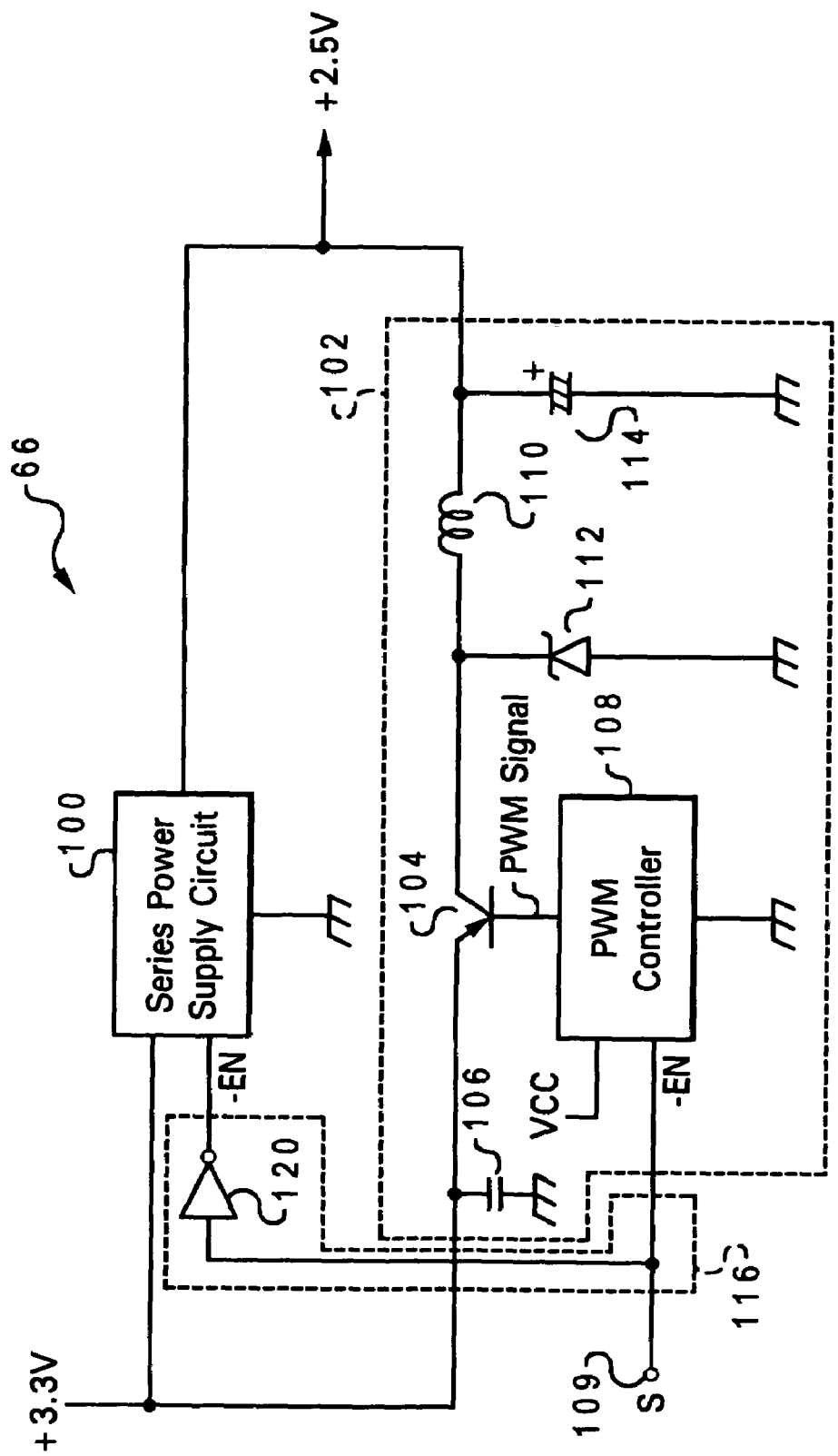
FIG. 3 is a schematic diagram of a DC/DC converter in accordance with a first embodiment of the present invention.
Figure 8A:
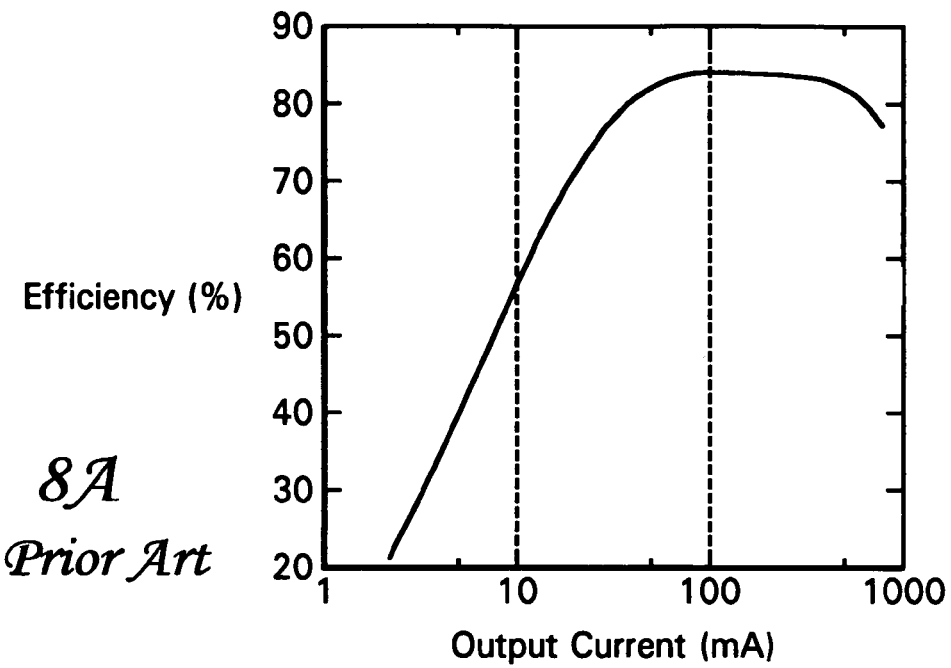
FIG. 8(A) is a graph depicting power conversion efficiency characteristics of a prior art switching power supply circuit.
Figure 8B:
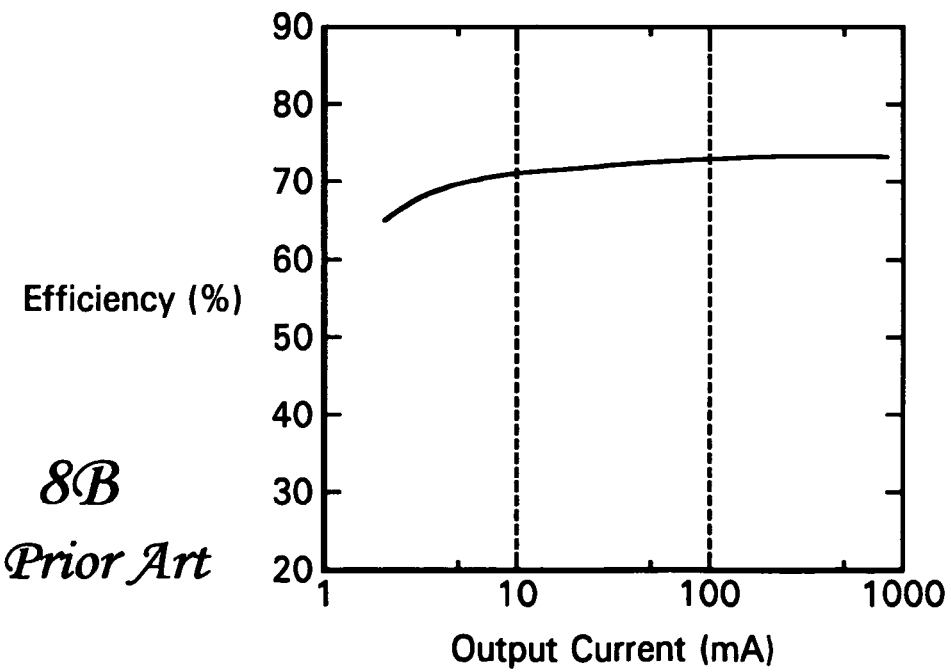
FIG. 8(B) is a graph illustrating power conversion efficiency characteristics of a prior art series power supply circuit.

Referring to FIG. 3, there is depicted is a schematic representation of DC/DC converter 66 in accordance with a first embodiment of the present invention. Within DC/DC converter 66 are a series power supply circuit 100 and a switching power supply circuit 102. Series power supply circuit 100 has power conversion efficiency characteristics for load conditions as shown in FIG. 8(B) while switching power supply circuit 102 has power conversion efficiency characteristics as shown in FIG. 8 (A). In accordance with the inventive principles as set forth herein, series power supply circuit 100 acts as a power supply circuit for lighter loads and is replaced by switching power supply circuit 102 for heavier loads.

Series power supply circuit 100 is connected to a power supply (not shown) which supplies a DC voltage of +3.3 V, and is also connected to a ground. An enable terminal (−EN) provides an activation control input signal to series power supply circuit 100. Series power supply circuit 100 is configured so as to output a DC voltage of a predetermined value (here, +2.5 V) when the enable terminal is active (here, at low level) and to enter a standby state in which the series power supply circuit itself consumes almost no power and provides no output voltage when the enable terminal is inactive (here, at high level).

In accordance with the embodiment depicted in FIG. 3, DC/DC converter 66 is configured such that a standby signal S is input to the enable terminal of the series power supply circuit 100 through an input terminal 109 and an inverter 120. The standby signal S is activated (here, at high level) when computer system 10 is in a suspended state, i.e., under light load, and inactivated (here, at low level) when computer system 10 is not in a suspended state, i.e., under a heavy load. Thus, series power supply circuit 100 is configured to output a DC voltage of a predetermined value when computer system 10 is in suspend state, and to enter standby state in which no voltage is output when computer system 10 is in non-suspended state. In this embodiment, the output current of DC/DC converter 66 is less than 20 mA during suspend state and exceeds 20 mA during non-suspend state. Standby signal S is equivalent to the "control signal" of the present invention.

A transistor 104 is included within switching power supply circuit 102. The emitter of transistor 104 is connected to the +3.3 V power supply. The emitter is further connected to one terminal of a capacitor 106 with the other capacitor terminal connected to a ground. Capacitor 106 is an input capacitor for switching power supply circuit 102 and serves to reduce noise and electromagnetic interference (EMI) and to improve power conversion efficiency.

The base of transistor 104 is configured such that a supply voltage VCC is applied and is connected to a terminal that outputs a pulse width modulated (PWM) signal from a PWM controller 108. The collector of transistor 104 is connected to one terminal of an inductor 110 which is p configured with a flywheel diode 112 and a capacitor 114.

PWM controller 108 comprises an enable terminal (−EN) that controls output of the PWM signal therefrom. When 0 the enable terminal is inactive (here, at high level), the PWM signal is not output and when the enable terminal is active (here, at low level), a PWM of a predetermined level is output. In accordance with the depicted embodiment, DC/DC converter 66 is configured such that the standby signal S is directly input to the enable terminal of PWM controller 108. Thus, switching power supply circuit 102 is configured to output a DC voltage of a predetermined value (here, +2.5 V) when computer system 10 is in non-suspend state, and to enter a standby state (i.e., to not output a voltage) when computer system 10 is in a suspended state.

The output of series power supply circuit 100 is connected with the output of switching power supply circuit 102 to form an output through which a DC voltage of +2.5 V is output. Input terminal 109 corresponds to the "input means" of the present invention; wiring from input terminal 109 to the enable terminals of both of the power supply circuits corresponds to the "switching means", and a switching circuit 116 including inverter 120 corresponds to the "activation means."

Of course, many electric circuits other than those in FIG. 1 are required to form the computer system 10. The description of these circuits, however, are omitted herein because they are well known to those skilled in the art and do not constitute the essential part of the present invention. For clarity, only relevant connections between hardware blocks are shown in the drawings.

The operation of DC/DC converter 66 will be described below, starting with the operation of DC/DC converter 66 during a suspended state. Because the standby signal S is high during a suspended state, the enable terminal of series power supply circuit 100 goes low, enabling a voltage of a predetermined value to be output from series power supply circuit 100. The high standby signal on the enable terminal of the PWM controller 108 causes PWM controller 108 to not output a PWM signal. Transistor 104 therefore remains off, and switching power supply circuit 102 outputs no voltage.

Next, the operation of DC/DC converter 66 in non-suspend state will be described. Because the standby signal S is low during a non-suspended state, the enable terminal of series power supply circuit 100 is at a high level, thus disabling series power supply circuit 100 from outputting a voltage. Because the standby signal S is low during a non-suspended state, the enable terminal of PWM controller 108 goes low, and PWM controller 108 therefore outputs a PWM signal of a predetermined duty. Transistor 104 is thereby repeatedly switched between on and off in accordance with the PWM signal to cause switching circuit 102 to output a voltage of the predetermined value.

Because the standby signal S is high under light load and low under heavy load as described above, series power supply circuit 100 is activated and switching power supply circuit 102 is inactivated under light load while series power supply circuit 100 is inactivated and switching power supply circuit 102 is activated under heavy load by the operations of the DC/DC converter 66 in the suspend state/non-suspend state as described above.

Figure 4:
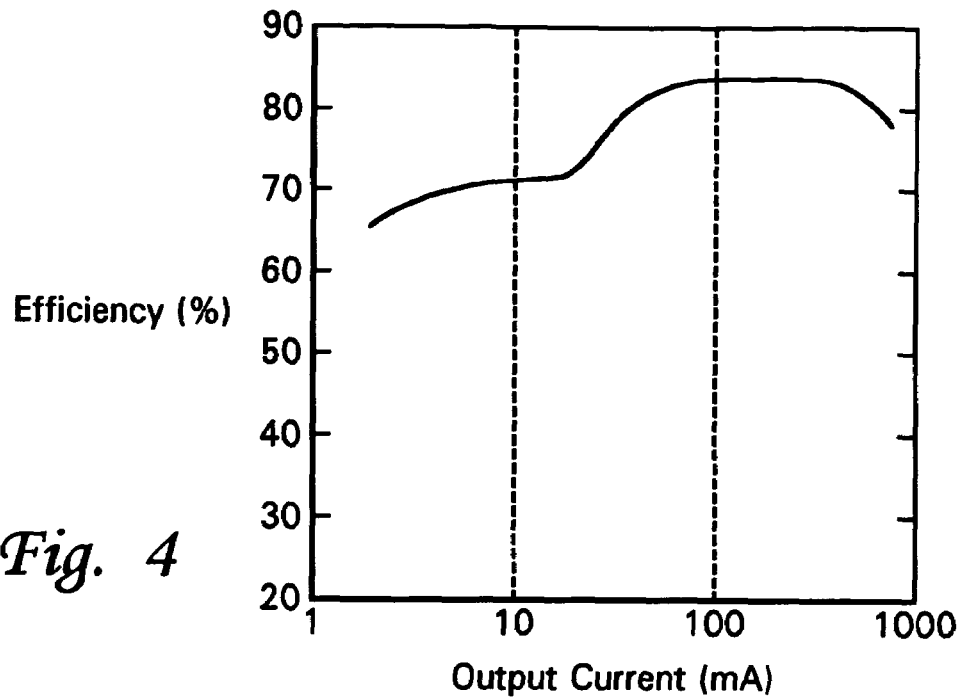
FIG. 4 is a graph illustrating DC/DC converter efficiency.

With reference to FIG. 4, there is illustrated a graph of power conversion efficiencies versus loads (the amounts of current) for DC/DC converter 66 in accordance with the first embodiment. As shown in FIG. 4, because series power supply circuit 100 is active in the output current region below 20 mA, a power conversion efficiency of about 70% is achieved. Because switching power supply circuit 102 is active in the region over 20 mA, the power conversion efficiency gradually increases from the power conversion efficiency under light load as the output current increases to achieve an efficiency of as high as 80%.

In accordance with the first embodiment, DC/DC converter 66 comprises two power supply circuits (switching power supply circuit 102 and series power supply circuit 100) having different power conversion efficiency characteristics for converting an input voltage to a predetermined voltage. Such a design allows output voltage to be provided from one of the two power supply circuits that in accordance with the current supply demand as translated by the standby signal converts power more efficiently. DC/DC converter 66 can thus provide a high power conversion efficiency under a wide range of loads from light to heavy.

The practical effects of the first embodiment in a suspended state of a computer system (notebook PC) are described with reference to FIGS. 1 and 3 as follows. It is assumed that the power consumption of the notebook PC in suspend state is 100 mW, and that the suspend state can be maintained for two weeks relying on the capacity of the battery 64 when the PC enters the suspend state with the battery 64 fully charged. It is further assumed that the 2.5 V output of DC/DC converter 66 is an output for video subsystem 26, which has a current consumption of 5 mA. It is also assumed that the power conversion efficiency of switching power supply circuit 102 is 40% and that of series power supply circuit 100 is 70% when the output current is 5 mA.

(1) For a conventional DC/DC converter wherein the switching power supply circuit outputs a voltage of +2.5 V:
Power consumption of the entire system in suspend state: 100 mW (assumption)
Total power provided by the +2.5 V-output switching power supply circuit in the suspend state (power conversion efficiency: 40%): 2.5 V*5 mA/0.4=31.25 mW
Duration in which suspend state can be maintained: 14 days (assumption)
(2) For DC/DC converter 66:
Total power provided by the +2.5-output switching power supply circuit (power conversion efficiency: 70%): 2.5 V5 mA/0.7=17.86 mW
Power consumption of the entire system in suspend state: 100 mW−(31.25 mW−17.86 mW)=86.61 mW
Duration in which suspend state can be maintained: 100 m' 14 (days)/86.61 mW=16.16 days Thus, a DC/DC converter designed in accordance with the principles set forth herein can maintain the battery-operated suspend state two days longer than the background art. Moreover, because the two power supply circuits within DC/DC converter 66 do not operate concurrently, the output precision of each power supply circuit can be made substantially the same as the output precision of the entire DC/DC converter 66. As a result the precision of the output of the DC/DC converter 66 can be made higher at a relatively low cost.

Furthermore, because in accordance with the first embodiment DC/DC converter 66 improves power supply efficiency under wide range of loads from light to heavy, its own power consumption can be reduced.

As explained with reference to FIG. 3, the first embodiment of the present invention employs switching between series power supply circuit 100 and switching power supply circuit 102 as per the state of standby signal S. A second embodiment is described hereinbelow in which a circuit for detecting power consumption is provided on the input side of the DC/DC converter and the switching between power supply circuits is made in accordance with the detected power consumption. The computer system of the second embodiment is substantially the same as that of the first embodiment (see FIGS. 1 and 2), and is not repeated hereinbelow. The configuration of a DC/DC converter as a power supply unit according to the second embodiment will be described first with reference to FIG. 5.

Figure 5:
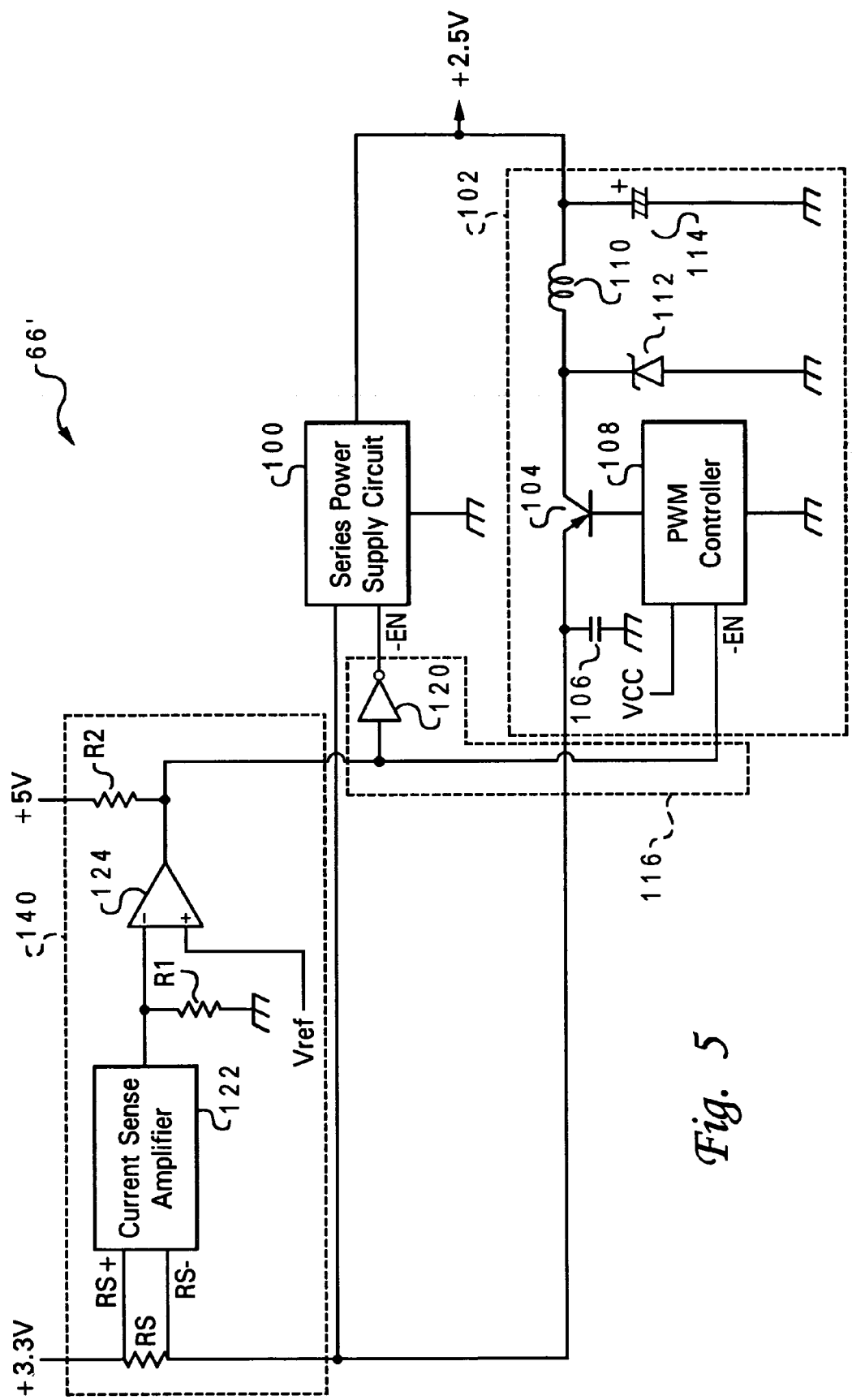
FIG. 5 is a schematic diagram of a DC/DC converter in accordance with a a second embodiment of the present invention.

Referring now to FIG. 5, there is depicted a schematic diagram of a DC/DC converter 66' in accordance with a a second embodiment of the present invention. As shown in FIG. 5, DC/DC converter 66' is similar to the DC/DC converter 66, except that no standby signal is used. Furthermore, a detecting circuit 140 comprising a current sense amplifier 122, a comparator 124, and resistances RS, R1, R2 and are incorporated within DC/DC converter 66'.

A resistance RS is utilized for detecting the amount of current through the source of each power supply circuit on a line for applying a DC voltage of +3.3 V to switching power supply circuit 102. Both terminals of the resistance RS are connected to the input terminals of current sense amplifier 122, which is configured as an IC. The output of current sense amplifier 122 is connected to the negative input (inverting input) of a comparator 124 and also to the non-grounded terminal of resistance R1.

A DC reference voltage $V_{ref}$ is applied to the positive input (non-inverting input) of comparator 124. Resistance R2 is connected between the output of the comparator 124 and a DC voltage of +5 V. The voltage at the output of comparator 124 is applied at two enable inputs: one is the enable terminal of series power supply circuit 100 through an inverter 120, and the other is the enable terminal of PWM controller 108 within switching power supply circuit 102.

The result is that, in light of the fact that the amount of current through the source of each power supply circuit is substantially proportional to that of its load current, one of series power supply circuit 100 and the switching power supply circuit 102 as incorporated within the DC/DC converter 66' is selected for operaton depending on the amount of the current flowing through the source of each power supply circuit, thereby achieving an operation depending on the amount of load presented. Detecting circuit 140 in communicative contact with the enable terminal of each power supply circuit corresponds to the "detecting of the present invention; the wiring from the output terminal (the output terminal of the comparator 124) of detecting circuit 140 corresponds to the "switching means" of the present invention; switching circuit 116 including inverter 120 corresponds to the "actuating means" of the present invention.

The operating principles of DC/DC converter 66' in accordance with the second embodiment will now be described. First, current flowing through the source of each power supply circuit is detected as a current flowing through resistance RS. The detected current is converted into a voltage across resistance R1 by current sense amplifier 122. The detection voltage is compared with reference voltage Vref (for example, 1.5 V) by comparator 124, and the output of comparator 124 is driven low if the voltage is higher than reference voltage Vref. If the detection voltage is lower than reference voltage Vref, the output of comparator 124 is driven high.

Thus, if the current (the magnitude of which is proportional to the amount of load current) flowing through resistance RS is greater than a predetermined value, the output of comparator 124 goes low and switching power supply circuit 102 is activated while series power supply circuit 100 is deactivated. If, on the other hand, the current flowing through resistance RS is smaller than the predetermined value, the output of comparator 124 goes high and series power supply circuit 100 is activated and switching power supply circuit 102 is deactivated.

In accordance with the above-mentioned principles of operation, series power supply circuit 100 is activated and switching power supply circuit 102 is deactivated under a light load. Conversely, series power supply circuit 100 is deactivated and switching power supply circuit 102 is activated under a heavy load. The value of reference voltage $V_{ref}$ is preset to the voltage that is applied at the negative input terminal of comparator 124 when the value of current flowing through resistance RS reaches a desired level relative to the load current that switches series power supply circuit 100 from the active state to the inactive state and switches switching power supply circuit 102 from the inactive state to the active state.

In accordance with the second embodiment depicted in FIG. 5, DC/DC converter 66' includes two power supply circuits (switching power supply circuit 102 and series power supply circuit 100) having different power conversion efficiency characteristics for converting an input voltage to a predetermined voltage. Moreover, DC/DC converter 66' provides for output power to be obtained from one of the power supply circuits that provides higher power conversion efficiency according to power consumption, thereby achieving high efficiencies under various load conditions from light to heavy.

In addition, because the two power supply circuits in DC/DC converter 66' do not operate concurrently, the output precision of each power supply circuit may be made substantially the same as that of the entire power supply unit, thereby achieving a high precision at a low cost.

Since power consumption is detected based on the amount of current input to the two power supply circuits within DC/DC converter 66', the output precision of the DC/DC converter 66' can be improved. Furthermore, because in accordance with the second embodiment computer system 10 utilizes a more efficient DC/DC converter, the power consumption of the overall computer system can be reduced.

Figure 6:
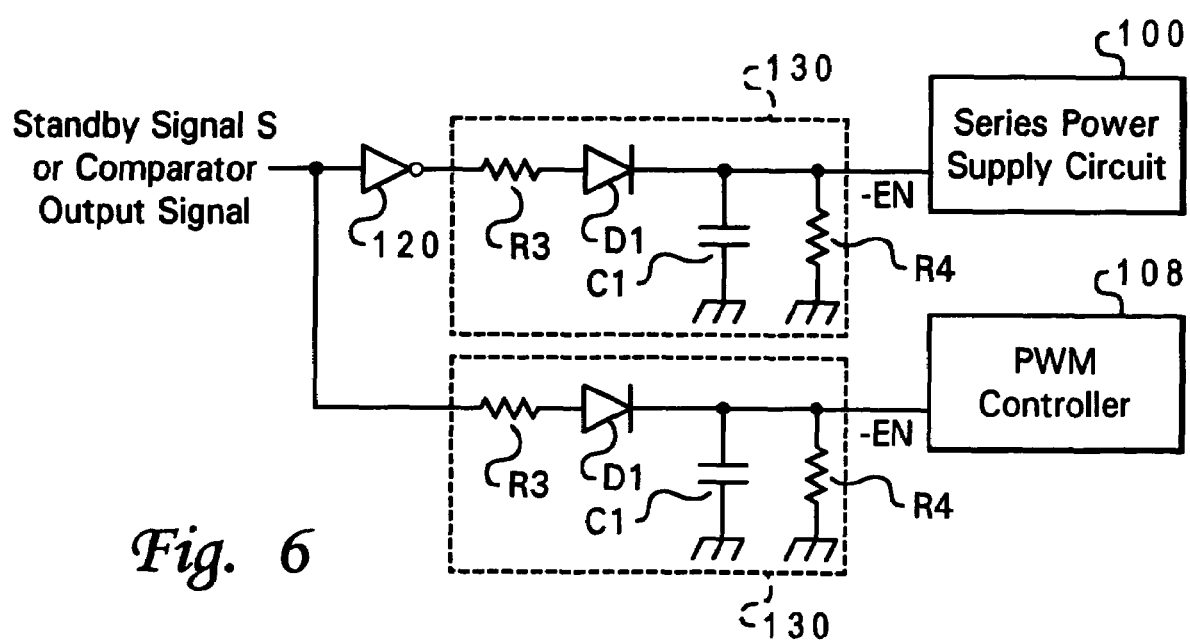
FIG. 6 is a schematic diagram of an exemplary DC/DC converter variation applicable to the first and second embodiments.

While an instantaneous power failure of output power during switching of the operation state of each of the power supply circuits has not been described in the embodiments described above, in practice such an instantaneous power failure may be occur during the switching. FIG. 6 is a schematic diagram of an exemplary DC/DC converter variation applicable to the first and second embodiments wherein such an instantaneous power failure can be prevented.

Turning back to FIG. 3, standby signal S is applied as an input to the enable terminal of series power supply circuit 100 through inverter 120 and the other is directly input to the enable terminal of PWM controller 108 within DC/DC converter 66 in accordance with the first embodiment. In accordance with the second embodiment, the output signal of comparator 124 is applied in an analogous manner as an input to the enable terminal of series power supply circuit 100 through the inverter 120 and the other is directly input to the enable terminal of PWM controller 108. In the embodiment depicted in FIG. 6, a holding circuit 130 is provided between the output terminal of inverter 120 and the enable terminal of series power supply circuit 100. Holding circuit 130 includes a series circuit consisting of a resistor R3, a diode D1, and parallel-connected capacitor C1 and resistor R4. A second holding circuit 130 configured similarly is connected between the dividing point of standby signal S or the output signal of comparator 124 and the enable terminal of PWM controller 108. Holding circuit 130 corresponds to the holding means of the present invention.

Figure 7:
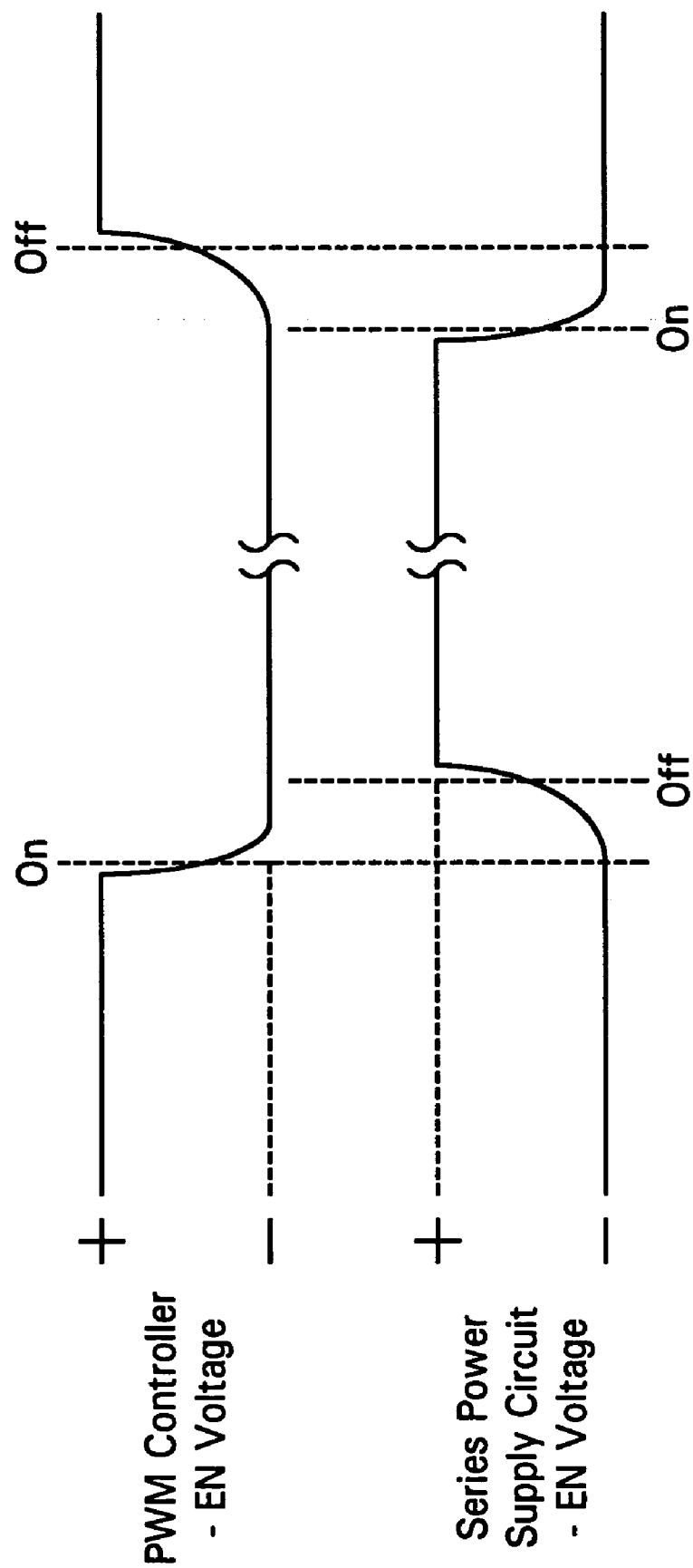
FIG. 7 is a waveform diagram illustrating operating effects of the DC/DC converter in FIG. 6.

By employing such holding circuits, both of the voltages applied to the enable terminals of the power supply circuits during switching between the power supply circuits may be maintained in an ON state (operating state) over a period of time when the power supply circuits switches between the active/inactive states as shown in FIG. 7 for example, thereby avoiding an instantaneous power failure of an output voltage. During the period in which both of the power supply circuits are in the ON state, a voltage is supplied to the load by one of the series or switching power supply circuits that can provide a higher voltage.

While in the above-described embodiments the DC/DC converter is comprised of discrete components, the present invention is not limited to such a configuration. For example, the series power supply circuit and the switching power supply circuit may be configured as a single IC. By doing so the area occupied by the DC/DC converter can be reduced and the operation of the DC/DC converter can be stabilized. Additionally, while a bipolar transistor is used as the switching device in the switching power supply circuit 102 in the embodiments described above, the present invention is not limited to this. For example, a MOS field effect transistor may be used. Furthermore, while in the embodiments described above only two power supply circuits, series power supply circuit 100 and switching power supply circuit 102, are used as the plurality of power supply circuits of the present invention, the present invention is not limited to this. In addition to series power supply circuit 100 and switching power supply circuit 102, other power supply circuits may be provided to configure an implementation in which a power supply circuit is selected depending on the current load.

As described above, the first power supply unit according to the present invention has the advantage that high efficiencies can be achieved under various load conditions from light to heavy because a plurality of power supply circuits are provided which have different power conversion efficiency characteristics for converting an input voltage into a predetermined voltage and output power is allowed to be obtained from one of the plurality of power supply circuits which converts power most efficiently according to a control signal, and the output precision of each power supply circuit can be made substantially the same as that of the entire power supply unit because the plurality of the power supply circuits do not operate concurrently, as a result, the high precision can be achieved with low costs.

Furthermore, the second power supply unit according to the present invention has the advantage that high efficiencies can be achieved under various load conditions from light to heavy because a plurality of power supply circuits are provided which have different power conversion efficiency characteristics for converting an input voltage to a predetermined voltage and an output power is allowed to be obtained from one of the plurality of power supply circuits which converts power most efficiently according to power consumption, and the output precision of each power supply circuit can be made substantially the same as that of the entire power supply unit because the plurality of the power supply circuits do not operate concurrently, as a result, the high precision can be achieved with low costs.

Furthermore, the computer according to the present invention has the advantage that high efficiencies can be achieved under various load conditions from light to heavy and therefore power consumption can be reduced, because a plurality of power supply circuits is provided which have different power conversion efficiency characteristics and output power is allowed to be provided from one of the plurality of power supply circuits which converts power most efficiently according to the state or amount of power consumption.

What is claimed is:

1. A voltage converter comprising:
a first power supply circuit capable of converting an input voltage to an output voltage;
a second power supply circuit capable of converting said input voltage to said output voltage, wherein said second power supply circuit is connected in parallel with said first power supply circuit; and
a detecting circuit for activating either said first power supply circuit to said second power supply circuit to convert said input voltage to said output voltage based on an amount of current supplied to said first and second power supply circuits.

2. The voltage converter of claim 1, wherein said first power supply circuit is a series power supply circuit, and said second power supply circuit is a switching power supply circuit.

3. The voltage converter of claim 1, wherein said first power supply circuit has a relatively high conversion efficiency during a low load demand, and said second power supply circuit has a relatively high conversion efficiency during a high load demand.

4. The voltage converter of claim 1, wherein said first power supply is activated by said detecting circuit when said current amount is below a predetermined value, wherein said second power supply is activated by said detecting circuit when said current amount exceeds said predetermined value.

5. The voltage converter of claim 1, wherein said current amount is below a predetermined value when said voltage converter is in a suspended state, wherein said current amount exceeds said predetermined value when said voltage converter is in a non-suspended state.

6. The voltage converter of claim 1, wherein said first and second power supply circuits share a common voltage input and a common voltage output.

7. The voltage converter of claim 1, wherein said detecting circuit includes a current sense amplifier coupled to a power input line for said first and second power supply circuits.

* * * * *